CATALYTIC HEATER

Original Filed April 26, 1965 4 Sheets-Sheet 1

INVENTORS:
DONALD V. BERCHTOLD
ELLWOOD E. LITTLE
WILLIAM J. MARSH
BY
Dawson, Tilton, Fallon, Lungmus & Alexander
ATT'YS

CATALYTIC HEATER

Original Filed April 26, 1965 4 Sheets-Sheet 2

INVENTORS:
DONALD V. BERCHTOLD
ELLWOOD E. LITTLE
WILLIAM J. MARSH
BY
Dawson, Tilton, Fallon, Lungmus & Alexander
ATT'YS

CATALYTIC HEATER

Original Filed April 26, 1965 4 Sheets-Sheet 3

INVENTORS:
DONALD V. BERCHTOLD
ELLWOOD E. LITTLE
WILLIAM J. MARSH
BY
Dawson, Tilton, Fallon, Lungmus & Alexander
ATT'YS

CATALYTIC HEATER

Original Filed April 26, 1965 4 Sheets-Sheet 4

INVENTORS:
DONALD V. BERCHTOLD
ELLWOOD E. LITTLE
WILLIAM J. MARSH
BY
Dawson, Dilling, Dallas, Lungmus & Alexander
ATT'YS United States Patent Office Re. 26,976
Reissued Oct. 27, 1970

26,976
CATALYTIC HEATER

Donald V. Berchtold, William J. Marsh, and Ellwood E. Little, Wichita, Kans., assignors to The Coleman Company, Inc., Wichita, Kans., a corporation of Kansas Original No. 3,343,586, dated Sept. 26, 1967, Ser. No. 450,710, Apr. 26, 1965. Application for reissue Sept. 19, 1969, Ser. No. 862,995
Int. Cl. F23d *3/02*
U.S. Cl. 431—241 20 Claims

Matter enclosed in heavy brackets [ ] appears in the original patent but forms no part of this reissue specification; matter printed in italics indicates the additions made by reissue.

*ABSTRACT OF THE DISCLOSURE*

*A portable heater having a refillable liquid fuel reservoir and a combustion head comprising a porous catalytic element.*

This invention relates to a catalytic heater, and more particularly to a portable catalytic heater which operates on a refillable liquid fuel charge. The catalytic heater of this invention is characterized by improved operating characteristics, especially by its capacity to sustain a substantially uniform high rate of fuel consumption from full fuel charge to empty.

Portable catalytic heaters operating on refillable liquid fuel charges have been manufactured and sold commercially in the United States and foreign countries for a number of years. Such heaters may be difficult to light, particularly under cold ambient temperature conditions. The catalytic combustion element must be heated to the minimum temperature at which catalytic combustion can be maintained before the regular operation of the heater will be initiated. The practice has been to pour a small quantity of liquid fuel on the combustion head, and allow this fuel to burn with a flame by applying a match or other external lighting means. However, under windy or cold conditions, several such attempts at preheating the combustion head may be required and considerable time may be expended before the catalytic combustion is initiated and maintained. In the lighting process, it is also desirable to promote the vaporization of fuel within the combustion head, but the preheating flame is on the outside of the combustion head, and thereby largely insulated from the interior vapor space into which the fuel vaporizes from the wick.

An even more serious problem is the recognized inability of existing catalytic combustion heaters to deliver their related B.t.u. output over the whole operating cycle from full fuel charge to empty. The B.t.u. output as measured by the fuel consumption rate increases to a maximum within the first few hours after operation, usually within the first one to two hours, and then begins to fall off during the balance of the operating cycle. The rate of fuel consumption and B.t.u. output for prior catalytic heaters has also been highly temperature-dependent. As the ambient temperature decreases, say from 72° F. to 32° F., the fuel consumption and heat output may drop from 25 to 50% or more. At lower temperatures, the fuel consumption rate and heat output still continue to peak within the first few hours, and then drop off rather rapidly. Consequently, under cold ambient temperature conditions, the heater may be delivering only a small fraction of its rated heat output during the first few hours of the operating cycle, and the discrepancy between rated and actual heat output will become markedly greater as the supply of fuel is consumed.

Another related problem is the general lack of uniformity of fuel consumption and heat output for prior catalytic heaters. As already indicated, operating curves of fuel consumption rate are time and temperature dependent. When there may be some leveling off or stabilization of the fuel consumption rate under more favorable ambient temperature conditions during the intermediate portion of the operating cycle, the general picture is one of great variability, the first few hours of operation being characterized by the fuel consumption rate attaining a maximum much higher than the rate during the intermediate portion of the cycle, and there is no true stabilization since the fuel consumption rate continues to decline as the fuel charge is consumed without any definite cutoff point.

The starting and operating characteristics of prior catalytic heaters as described herein have been studied and confirmed by independent testing organizations, such as the National Research Laboratories of the National Research Council of Canada. In this connection, reference is particularly made to N.R.C. Report No. 6069, Low Temperature Operation of a Catalytic Combustion Heater, Ringer (October 1960). As far as applicants are aware, since the publication of that report and prior to the present invention, no significant improvements have been made in the operating characteristics of catalytic heaters.

It is, therefore, a primary object of the present invention to design and develop a catalytic combustion heater which substantially overcomes the problems and difficulties described above. More specifically, it is an object to provide a catalytic heater which is easier to light, especially at cold temperatures. Another important object is to provide a catalytic heater of the character described which is capable of sustaining a substantially uniform high rate of fuel consumption from full fuel charge to empty, thereby enabling the heater to be operated at or near its rated capacity over the entire operating cycle. Another closely related object is to provide a catalytic heater where the fuel consumption rate and heat output are substantially less temperature dependent, thereby making it possible to deliver substantially the rated B.t.u. output at cold ambient temperatures where the maximum heat output is particularly needed. Further specific objects and advantages will be indicated in the following detailed specification.

This invention is shown in illustrative embodiments in the accompanying drawings, in which.

Figure 1:
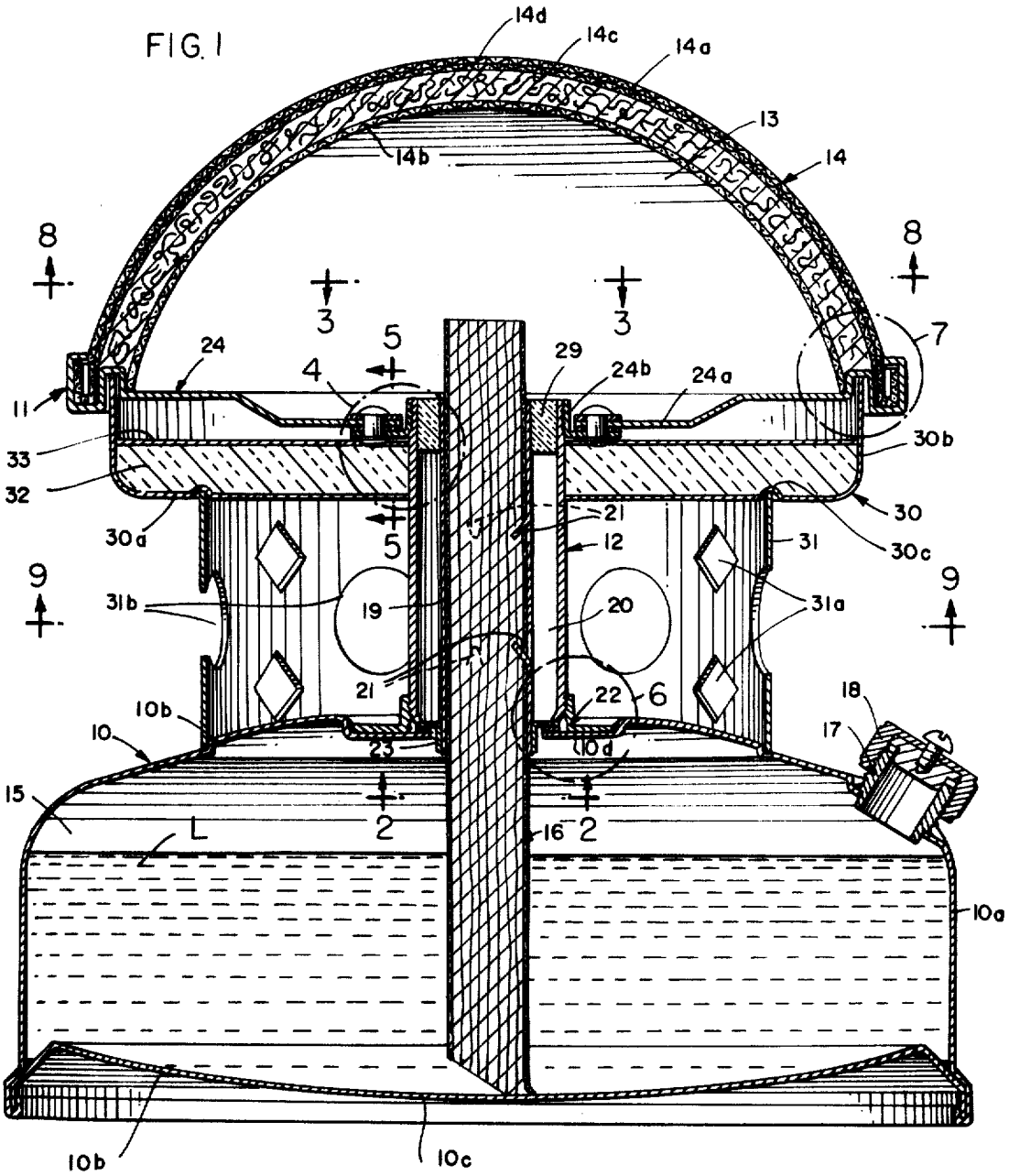
FIGURE 1 is a sectional elevational view of a catalytic heater constructed in accordance with the present invention.

Looking first at FIG. 1, there is shown a catalytic heater of the kind having a base housing designated generally by the number 10, a combustion head designated generally by the number 11, and a tubular connector designated generally by the number 12. Connector 12 extends between the combustion head 11 and the base housing 10. The combustion head 11 provides an enclosed fuel vapor collection space 13, and a porous catalytic combustion element designated generally by the number 14. Element 14 is in vapor transfer relation with collection space 13.

The base housing 10 provides a reservoir 15 for a liquid fuel L. The heater of the present invention is characterized by having an open or unpacked reservoir for the liquid fuel, as distinguished from prior catalytic heaters where the standard practice was to fill or pack the reservoirs with an absorbent, fibrous material, such as cotton batting, cotton linters, wool, felt, etc. For achieving the objects of the present invention, it is important that the reservoir 15 and the pool of liquid fuel therein are in open, unhindered flow communication with the lower portion of the capillary action wick 16, which preferably extends into and substantially to the bottom of the reservoir 15, as shown in FIG. 1.

In the illustration given, the base housing 10 is formed from a shell 10a which is united by brazing to a bottom 10b having a downwardly dished central portion 10c for receiving the lower end of wick 16 to maintain the bottom of the wick in fuel transfer relation with the last portions of the fuel charge. A filler plug bushing 17 extends through an opening in the upper portion of shell 10a, and is connected thereto by brazing. Bushing 17 is threadedly connected to a removable closure cap 18. Since these elements are of conventional construction, it is not believed it will be necessary to further discuss them herein. It will be understood that cap 18 is removed for introducing the liquid fuel L to the reservoir 15, and then replaced to provide a sealed closure during the operation of the heater.

In accordance with the present invention, a suitable fuel transfer means extends through connector 12 for transferring the fuel from the reservoir 15 to collection space 13 within head 11. For achieving the objects of the present invention, it is important that the fuel be transferred substantially entirely in the liquid state, that is, it is desired to minimize or substantially eliminate the transfer of fuel in a vapor state from reservoir 15 to collection space 13.

As previously indicated, the fuel transfer means includes a capillary action wick 16 as a principal component. In the illustration given, the fuel transfer means also includes a wick tube 19, which extends through the outer support tube which forms connector 12 and is spaced inwardly therefrom to provide a vertically extending annular recess or air space 20. An intermediate portion of the wick 16 extends through and is snugly received within wick tube 19. The upper portion of the wick 16 terminates in communication with vapor collection space 13 and preferably extends into the collection space 13 to a predetermined height therein, as shown in FIG. 1.

Figure 3:
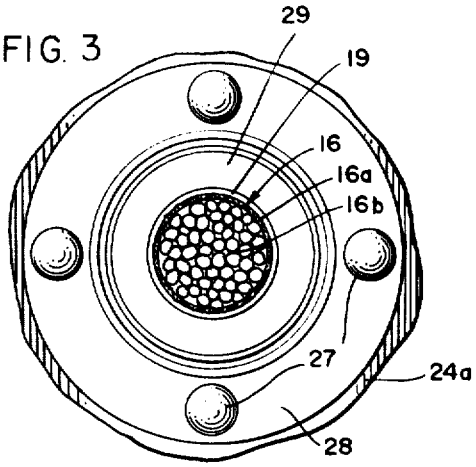
FIGURE 3 is a fragmentary sectional view taken on line 3—3 of FIG. 1.

Wick 16 may be formed of various materials and may have different cross-sectional shapes while achieving the objects of the present invention. Preferably, however, the wick is formed of non-combustible fibers or filaments, such as fiberglass, and has a circular shape in cross section. The construction for wick 16 is shown more clearly in FIG. 3. It will be noted that it has an outer woven tube 16a, which encloses tightly packed bundles 16b of vertically extending filaments. While the wick may also be formed of cotton or other conventional material, the exposed upper portion of the wick, when positioned within vapor collection space 13 as preferred in accordance with the present invention, may become burned or charred and thereby cause a reduction or variation in the fuel vaporization rate. However, either a wick of non-combustible or combustible materials may be used to achieve many of the advantages of the present invention, which broadly requires a capillary action wick for transferring fuel in the liquid state, while minimizing or preventing the transfer of vaporized fuel. Wicks of the type described, when saturated with liquid fuel, substantially preclude the transfer of fuel vapors therethrough. The liquid fuel is therefore drawn into the bottom portion, particularly the lower end of the wick 16, passes upwardly therethrough by capillary action, and is evaporated on the exposed outer surface of the upper portion of the wick, passing into the vapor state within collection space 13.

Figure 9:
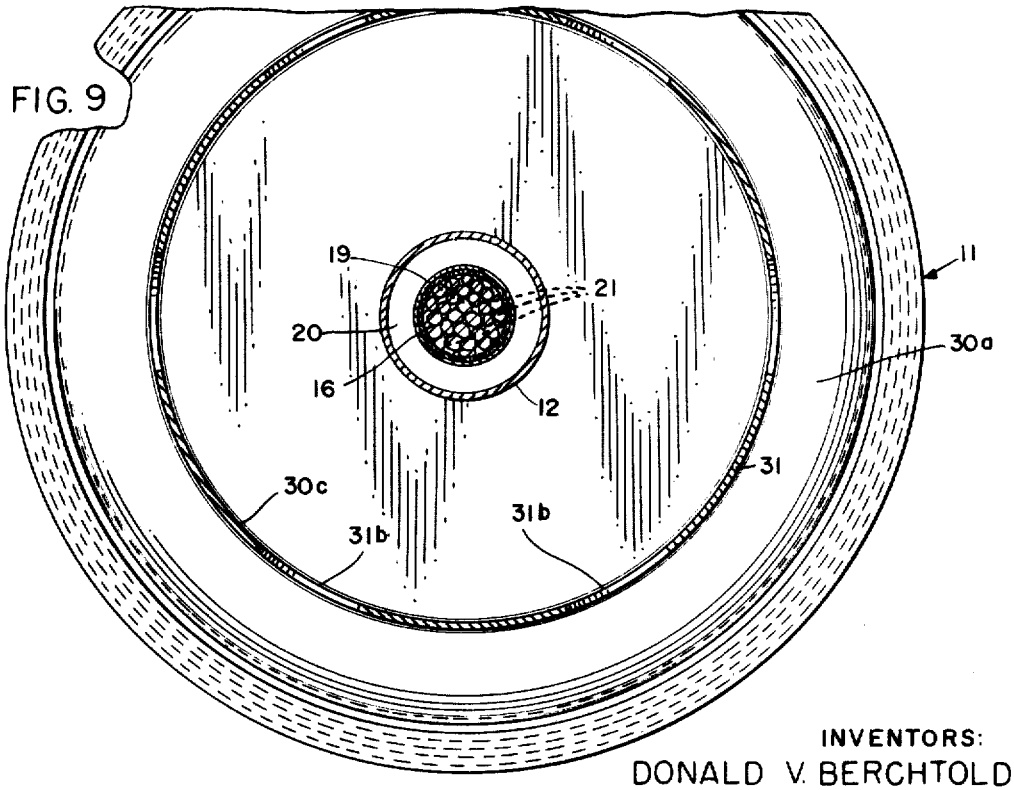
FIGURE 9 is a sectional view taken on line 9—9 of FIG. 1.

As indicated, it is preferred to have the upper portion of the wick 16 extend into space 13 to a predetermined height therein, and to provide means for positioning and holding the selected position of the wick. For example, there can be provided suitable means for fixedly maintaining the position of the wick, especially the position of the exposed upper end portion of the wick. In the illustration given, the intermediate portion of the wick is locked to wick tube 19. At two levels, triangular portions of the tube wall comprising lances 21 are struck out and turned inwardly to engage the wick 16 as shown in FIGS. 1 and 9. In the illustration given, three of the wick-retaining lances 21 are provided at each of the levels, as indicated more clearly in FIG. 9. In production, a length of wicking can be inserted in the tube 19, and the protruding ends cut off to the exact lengths required, respectively, to project into the collection space 13 to an established height, and to descend to the required point within reservoir 15.

The support tube 12 and the wick tube 19 can be attached to and mounted on the top of base housing 10 by various means. One suitable mounting is illustrated in FIG. 1 and shown more clearly in FIG. 6. In the illustration given, the top of shell 10a provides a central recess portion 10b surrounding an opening 10e through which wick tube 19 extends into the top of reservoir 15. An attachment collar 22 provides a horizontally-extending annular portion 22a which seats on shell portion 10d and has its outer end united thereto by brazing as indicated in FIG. 6, and provides a vertically-extending cylindrical portion 22b which is internally threaded for connection to the externally threaded lower end portion of support tube 12.

Figure 6:
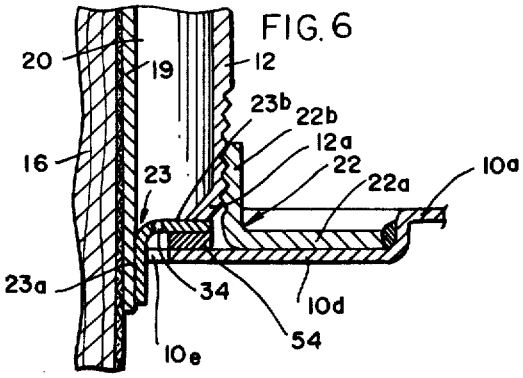
FIGURE 6 is a fragmentary enlarged elevational view of the area 6 of FIG. 1.

As shown more clearly in FIG. 6, another attachment collar 23 is provided which has a downwardly extending tubular portion 23a receiving the lower end of wick tube 19 and being united thereto by spot welding. Collar 23 also provides an outwardly extending annular portion 23b which overlaps the inner end of shell portion 10b. Preferably, an annular gasket 54 is interposed between the overlapping ends of collar portion 23b and shell portion 10d for the purpose of providing a vapor seal. Gasket 54 is preferably formed of a heat resistant, heat insulating material, such as compressed long fiber asbestos with a synthetic rubber (e.g., S.B.R.) binder. Gasket 54 can be conveniently held in place by a clamping action. In the illustration given, the lower end 12a of tube 12 is turned inwardly so that it bears against the top of collar portion 23b, thereby producing a clamping action on gasket 54 when tube 12 is screwed downwardly as far as it will go within collar 22.

Combustion head 11 may be conveniently mounted on the upper end portion of connection tube 12. One preferred manner of accomplishing this is shown in FIG. 1 and illustrated more clearly in FIG. 4.

Figure 4:
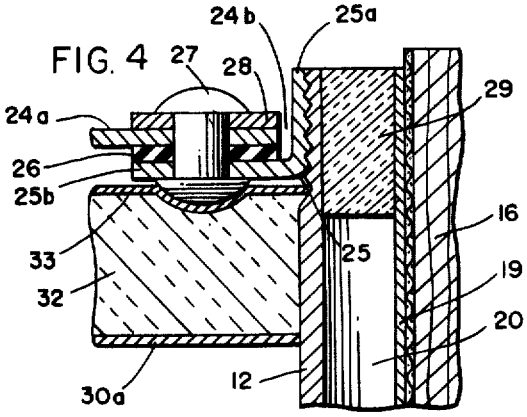
FIGURE 4 is a fragmentary enlarged elevational view of the area 4 of FIG. 1.

In the illustration given, the bottom of combustion head 11 is formed by a horizontally-extending plate, which has a downwardly formed central portion 24a terminating in a central opening 24b through which the upper end of tube 12 extends, as shown more clearly in FIG. 4. An attachment collar 25 provides a vertically-extending portion 25a which is internally threaded for connection to the externally threaded upper end of tube 12, and provides a horizontally-extending annular portion 25b which overlaps with plate portion 24a. Preferably, an annular gasket 26 of a heat-resistant, heat-insulating material, such as compressed long fiber asbestos, is interposed between the overlapping portions 24a, 25b. Gasket 26 can be clamped therebetween to form a vapor seal by any suitable clamping means. In the illustration given, circumferentially spaced rivets 27 are employed, the position of the rivets being shown more clearly in FIG. 3. If desired, as shown, a stiffener ring 28 can be positioned on top of plate portion 24a to form part of the assembly clamped by rivets 27.

In accordance with the present invention, heat insulating means is interposed in the paths of conductive heat flow from the combustion head 11 through the connector 12 and associated components, such as wick tube 19, to base housing 10 for minimizing the heating of reservoir 15 and the liquid fuel therein by conduction of heat from the head of the construction. With the construction previously described, gasket 26 serves this purpose, as also does gasket 54. For example, these gaskets may be formed of an asbestos material of low heat conductivity, as compared with the metal forming the plate 24. For a purpose which will subsequently be described, it is actually prefered to form plate 24 of a highly heat conductive metal, such as aluminum or copper, or to make it of an especially heavy gauge steel, and this construction make it all the more important to provide a barrier for the conduction of heat from the inner end portion of plate 24 to space 10.

It is also preferred to construct the tubes 12 and 19 to reduce or minimize the conduction of heat through these elements. For example, the support tube 12 may be formed of stainless steel, which has a relatively low heat conductivity as compared with ordinary carbon steel. For example, most stainless steels have a thermoconductivity at 212° F. of less than 15 expressed as B.t.u./(hr.)(sq. ft.)(° F. per ft.). Wick tube 19 may be formed of ordinary carbon steel or stainless steel, but preferably has substantially thinner walls, that is, being of lighter gauge than tube 12, thereby providing a heat conductive path of minimum cross section through 19. Alternatively, either tube 19, tube 12, or both, may be formed entirely of a material of relatively low heat conductivity, such as a heat-resistant plastic.

As shown more clearly in FIG. 6, the connection between tubes 12 and 19 is designed to provide a minimum heat conductivity path. Tube 19 is in heat conductive relation with shell 10a only through the restricted contact collar portion 23b and tube end 12a, while tube 12 is in heat conductive relation with the shell only through the threadedly connected portion of connector 22b and tube end 12. The annular air space 20 between the tubes 12 and 19 also serves an insulating function. The top of annular space 20 may be left open, but is preferably closed with an annular plug of absorbent, fibrous, heat insulating material, such as fiberglass. When the catalytic heater is extinguished after being in operation, moisture as a product of combustion may be drawn into the vapor space 13, and condensed therein. The porous absorbent plug 19 will retain moisture which might otherwise run downwardly to the bottom of annular space 20, causing rust and possibly entering reservoir 15. The moisture will evaporate and the plug 29 will dry out when the heater is lighted.

The porous catalytic element 14 of the heater can be constructed in various ways, and of various configurations. In the illustration given, the element, which is designated generally by the number 14, is hemispherical in shape, and is formed from an outer screen 14a, an inner screen 14b, a catalyst layer 14c immediately below outer screen 14a, and a backing or filler layer 14d extending between catalyst layer 14c and inner screen 14b. Screens 14a and 14b are preferably formed of woven metal wire such as a metal hardware cloth. Catalyst layer 14c can be a thin layer of asbestos burlay impregnated with a platinum catalyst. The thicker backing layer 14c is preferably a non-combustible fibrous material. A mat of ceramic fibers is particularly suitable.

Figure 7:
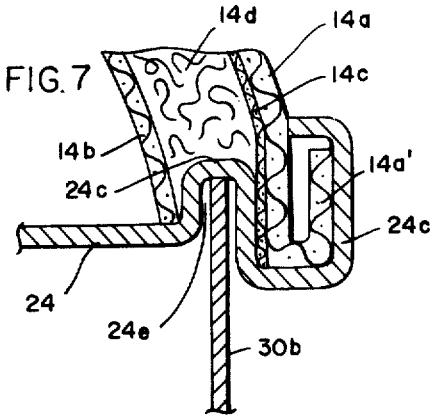
FIGURE 7 is a fragmentary enlarged elevational view of the area 7 of FIG. 1.
Figure 8:
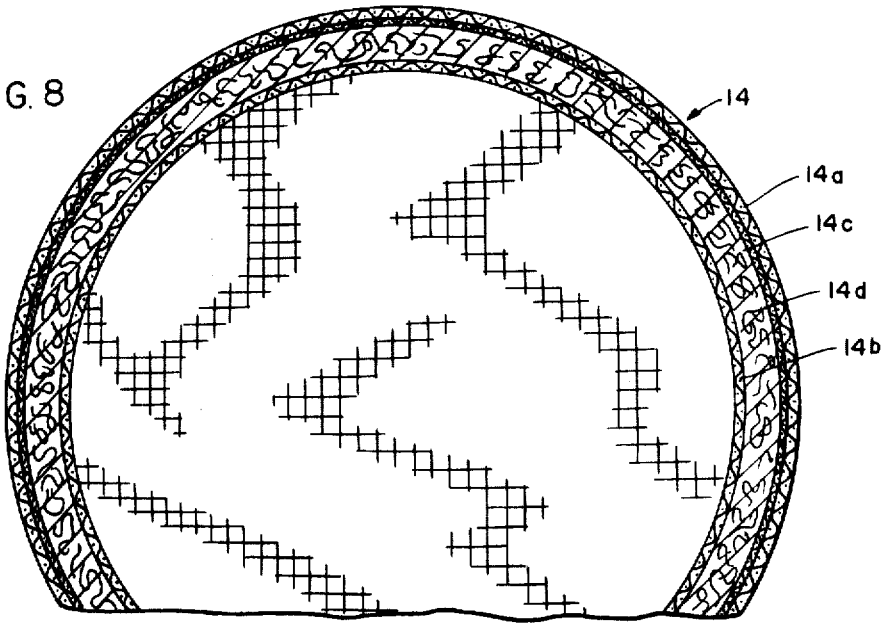
FIGURE 8 is a sectional view taken on line 8—8 of FIG. 1.

In achieving the objects of this invention, it is desirable to connect the lower portion of screen 14a to the periphery of plate 24 in heat transfer relation therewith. As shown in FIG. 1 and more clearly in FIG. 7, the lower outer portion of screen 14a may be folded and turned upwardly to form a flange 14a′, and the outer portion 24c of plate 24 crimped around the screen flange 14a′ to mechanically unite these members and to connect them for conductive heat transfer. This assembly is further stabilized by the upwardly extending annular bridge 24d in plate 24 which assists in clamping the lower portion of screen 14a against plate portion 24c. The asbestos burlap impregnated with the catalyst, as represented by the layer 14c, can extend downwardly beyond the top of ridge 24d so that it may also be securely clamped between ridge 24d and the joint formed by the upwardly turned portion 14a′ of the outer screen and plate portions 24c. The underside of the ridge 24d provides an annular recess 24e, the purpose of which will subsequently be described. The inner screen 14b can extend downwardly so that its lower edge rests on the top of plate 24 immediately inward of the ridge 24d, but the screen does not need to be mechanically attached to plate 24.

With the arrangement just described, both during starting and in normal operation heat will be conducted from outer screen 14a to plate 24, which in the preferred construction is formed of a highly heat-conductive metal, such as aluminum or copper. This conduction of heat to plate 24 has particular advantage in starting the heater, since plate 24 can thereby radiate heat to the underside of the catalytic element 14 while at the same time heating space 13 and the exposed upper portion of wick 16. In this way, the catalytic layer 14c can be more quickly brought to the temperature required to maintain catalytic combustion, and the rate of evaporation of fuel from the upper portion of wick 16 is promoted.

The design of plate 24 to function as a heat-conducting, heat-radiating member accentuates the tendency of this plate to radiate heat to the base housing 10, and thereby heating the reservoir 15 and the liquid fuel therein. Since according to the present invention it is desired to minimize the transfer of heat to base 10, whether by conduction or radiation, it is desirable to mount radiation baffle means between the plate 24, which forms the bottom of combustion head 11, and the top of base housing 10, which is formed by shell 10a, thereby reducing the transfer of radiant heat from head 11 to base 10. In the illustration given, there is provided an insulation pan 30 having a horizontally-extending bottom 30a and a vertically extending, circular side wall 30b. The upper end of side wall 30b is received within recess 24e provided by plate 24, but is not connected to the plate. The bottom 30a of the pan 30 is supported on the top of a collar 31, as shown in FIG. 1. The upper end of collar 31 is received within an annular recess 30c which is formed in bottom 30a. The lower end of collar 31 extends over and bears against an annular ridge which is formed in the top of shell 10a. With this construction, there is no need to attach collar 21 to either pan 30 or to base 10, and it is preferably unattached to these members. Pan bottom 30a extends inwardly to connector tube 12 but is preferably unattached thereto. With this construction, pan 30 and collar 31 can be removed after head 11 is unscrewed from connector 12. When head 11 is screwed down securely in place, the ridge 24d of plate 24 bears against the upper end of pan wall 30b, and the bottom portion of the pan which provides the recess 30c in turn bears against the upper end of collar 31, which in turn bears against the top of shell 10a adjacent the ridge 10f. The parts can thus be held securely together in a tight, rattle-free condition, while at the same time being readily removable for inspection or servicing of the heater.

Figure 5:
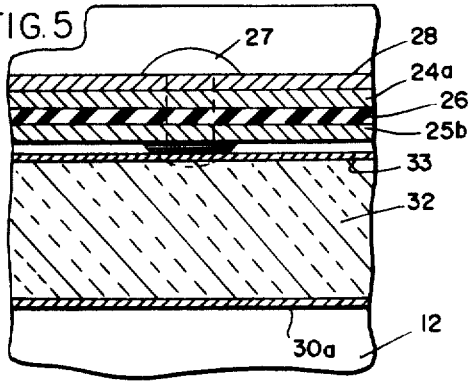
FIGURE 5 is a fragmentary sectional view taken on line 5—5 of FIG. 1.

Since pan 30 is preferably formed of metal, an insulating layer or blanket 32 is preferably supported within the pan as shown in FIGS. 1, 4 and 5. A blanket or mat of fiberglass is suitable, although other heat insulating fibrous materials can be used such as mats or ceramic fibers, etc. The insulating mat 32 can be received within the pan 30 without being attached thereto. To provide further insulation from radiant heat transfer, the upper surface of mat 32 can be provided with a heat reflective layer 33, such as a layer of aluminum foil or other metal foil. For convenience, the metal foil layer 33 can be adhesively bonded to the fiberglass mat 32. The assembly of the mat 32 and foil layer 33 can be held in place if desired, but the assembly may lay unattached in pan 30, as shown.

Collar 31 is preferably ventilated to still further reduce the conduction of heat through the collar to the base 10. For example, the collar can be provided with a series of openings such as the openings 31a and 31b.

Figure 2:
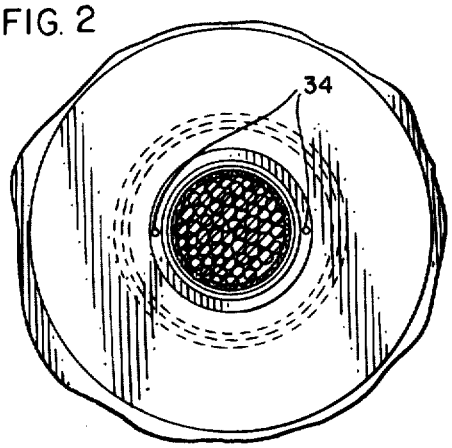
FIGURE 2 is a fragmentary sectional view taken on line 2—2 of FIG. 1.

With the construction described herein, base 10 and the reservoir 15 can be substantially insulated from the head 11, the transfer of heat from the head to the base by either radiation or conduction being reduced to a very low level. Reservoir 15 and the liquid therein will therefore normally be at substantially the same temperature as the surrounding atmosphere. Under certain conditions of operation, however, the temperature of the reservoir and of the liquid fuel may be somewhat higher than ambient temperature. Since any change in the temperature of reservoir 15 and the liquid therein will tend to produce a change of pressure in the vapor space above the pool of liquid fuel, there may still be conditions where a greater than atmospheric pressure would tend to be created within reservoir 15. It has been found that such increased pressure may affect the rate of fuel transfer from reservoir 15 to head 11, thereby making the fuel consumption rate and heat output less uniform than would otherwise be desirable. Consequently, it is desirable to provide pressure relief means communicating with reservoir 15 for maintaining the reservoir at substantially atmospheric pressure. As shown more clearly in FIG. 6, the inward part of collar portion 23b which is in alignment with opening 10e may be provided with one or more perforations. In the illustration given, two perforations 34 are provided, as shown more clearly in FIG. 2. Preferably, the diameter and number of the pressure relief openings is kept to a minimum. Only very small openings are required to provide for the desired pressure equalization, and the use of small openings has the advantage of minimizing fuel leakage if heater is accidentally upset when not in use. In practice, it has been found that two holes 1/16" in diameter are entirely adequate for pressure equalization, while substantially no fuel vapor is transmitted to head 11.

OPERATION

The operation of the catalytic heater constructed as illustrated in FIGS. 1 to 9 will be largely apparent from the foregoing description. However, it may be briefly summarized as follows:

Reservoir 15 is filled with a suitable liquid fuel, such as white gasoline, or other volatile petroleum fraction which is free from lubricating oil, tetraethyl lead, or other substance which might poison the catalyst. After the filler cap 18 has been replaced to close the reservoir, a small quantity of the same fuel (e.g. two ounces) can be poured around the outer portion of the porous catalytic element 14 and over the top of the element. The fuel on the element can then be ignited with a match or a lighter. After flaring has subsided, the heater should reach maximum heat output in a very short time (e.g. ten to fifteen minutes). During the lighting and the initial warmup period, heat will be conducted from the metal outer screen 14 to the heat conductive plate 24. Radiation of heat from plate 24 will tend to increase the interior temperature of the head, promoting vaporization from the exposed upper portion of wick 16, and radiating heat to the catalytic element 14 to bring this element up to the catalytic combustion temperature in a shorter time.

In the operation of the heater, the liquid fuel will be transferred by wick 16 from reservoir 15 to the upper end of the wick where it will evaporate and enter collection space 13. Fuel vapors will then pass outwardly through the porous catalytic element 14 and burn on the catalyst-containing layer 14c by combination with the oxygen in the surrounding air. With the design shown, the heater will operate for from 15 to 18 hours on three-quarters of a gallon of fuel while delivering a substantially consistent heat output of approximately 5,000 B.t.u. per hour. The fuel consumption and heat output can be maintained at a substantially uniform high rate over the entire operating cycle from full fuel charge to empty. While the fuel consumption and heat output will drop slightly as the ambient temperature decreases, the rated capacity ±10% can be obtained under most conditions of operation. The temperature of reservoir 15 remains substantially at the ambient temperature, while the pressure of the reservoir remains substantially at atmospheric pressure. These factors promote the uniform operation of the heater.

Figure 10:
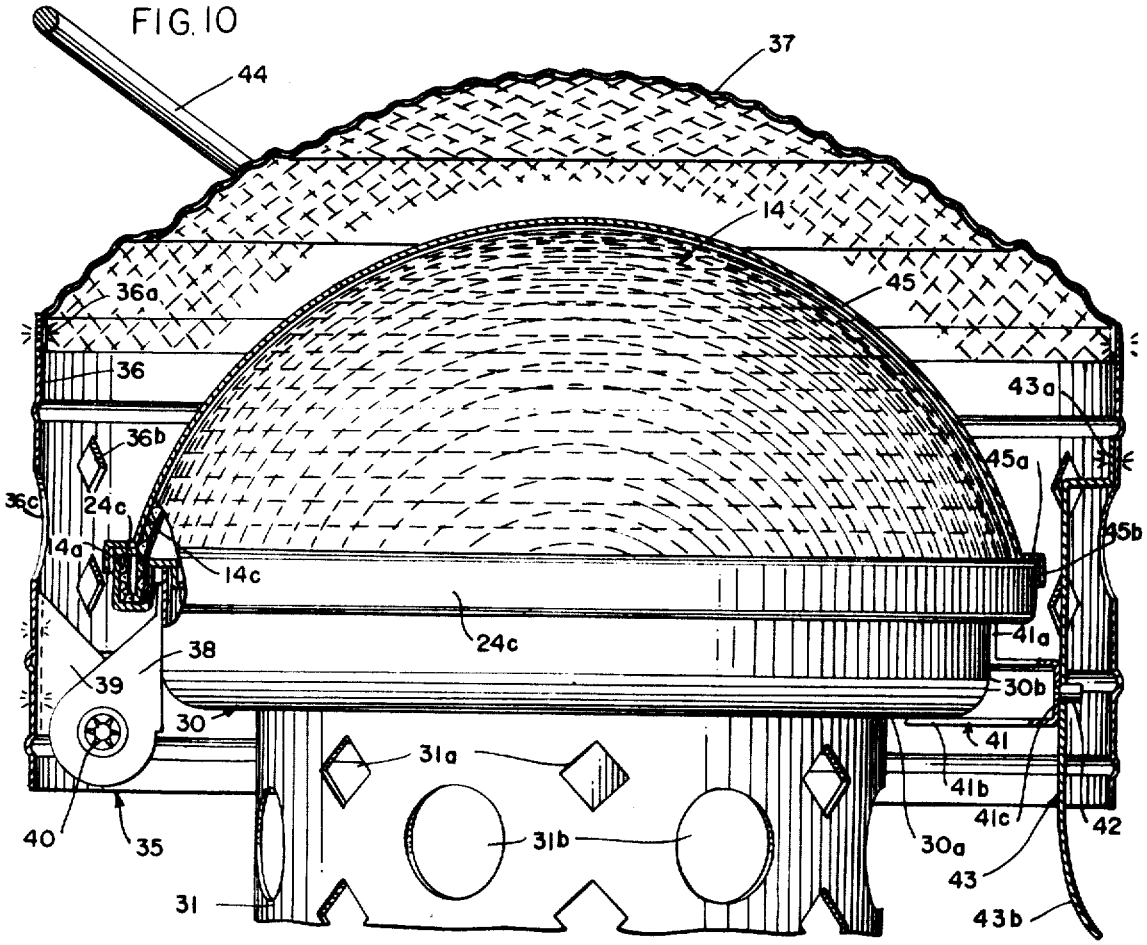
FIGURE 10 is a fragmentary elevational view showing the upper portion of the heater of FIG. 1, partly in section, the heater being equipped with a protective canopy and a snuffer cover.

FIGURE 10 illustrates two other elements which may advantageously be used in conjunction with the catalytic heater of FIG. 1. These are the protective canopy designated generally by the number 35, and the snuffer cover 45. The protective canopy 45 encloses head 14 and is mounted thereon. As indicated in FIG. 10, the canopy terminates above and out of contact with the base housing 10. In this way, the conduction of heat from canopy 35 to the base housing 10 is prevented.

In the illustration given, canopy 35 includes a cylindrical canopy shell 36 which forms the side wall of the canopy, and a dome-shaped canopy screen 37, which may be formed of expanded metal, wire screen, or other suitable material. The lower edge portion of the screen 37 is received within the top of the shell 36 and is united thereto by spot welding. To provide for and control the admission of air to the catalytic element 14c, shell 36 is provided with openings, such as the openings 36b and 36c, which may be arranged in an artistic pattern complementary to the arrangement of the openings in collar 31.

Preferably, canopy 35 is hingedly mounted on head 14. In the illustration given, a hinge strap 39 is connected to the inside of shell 36 by spot welding and is pivotally connected at 40 to a hinge butt 38 which is connected by spot welding to the outside of wall 30b of pan 30. One or more latch means may be provided in opposing or circumferentially offset relation to the hinge means. In the illustration given, the strike bracket 41 has an upwardly-extending leg 41a spot welded to the outside of wall 30b and a lower leg portion 41b spot welded to pan bottom 30a. A pin 42 is weldably connected to the vertically-extending outer portion 41c of the strike. Pin 42 extends through an opening in the intermediate portion of spring latch 43 for releasable engagement therewith. Latch 43 provides an outwardly offset upper portion 43a which is connected to the inside of shell 36 by spot welding. The latch also provides downwardly-extending tab portion 43b for use in engaging and disengaging the latch 43 with the pin 42. It will be understood that more than one of the strikes 41 and latches 43 may be provided. In practice, it has been found that a desirable construction includes two of the strike and latch members, offset approximately 120° from the location of the hinge member.

To facilitate carrying of the heaters, a handle 44 may be provided, the handle having lower end portions (not shown) which are pivotally connected to shell 36. For use in extinguishing the heater, the snuffer cover 45, which is in the form of an imperforate, hemi-spherical member, is received over element 14, as illustrated in FIG. 10. The lower portion of canopy 45 provides an outwardly-extending flange 45 and a downwardly-extending flange 45b. The flange 45 seats on the shelf provided by the upper end portion of the crimped plate periphery 24c, and the flange 45b extends downwardly along the vertically-extending side of plate portion 24c.

Providing the catalytic heater equipped with canopy 37 and snuffer cover 45, latch 43 will be opened, and the canopy swung upwardly and outwardly to permit the removal of the cover 45, and the lighting of the combustion head 14, as previously described. After the heater has been started, canopy 37 can be swung over the head and relatched, thereby serving its primary function of protecting the combustion head 14 against accidental contact while in operation, and at the same time controlling and directing the air supply to the combustion head.

Figure 11:
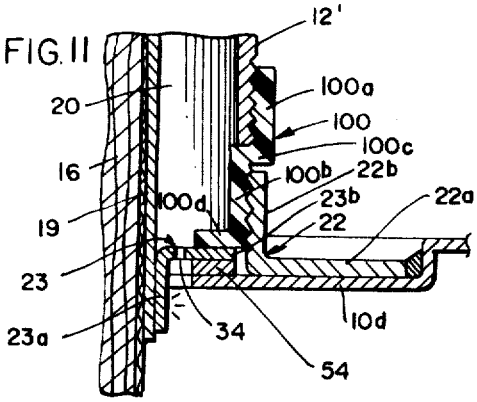
FIGURE 11 is a view similar to FIG. 6, showing a modification of the construction of FIG. 1.
Figure 12:
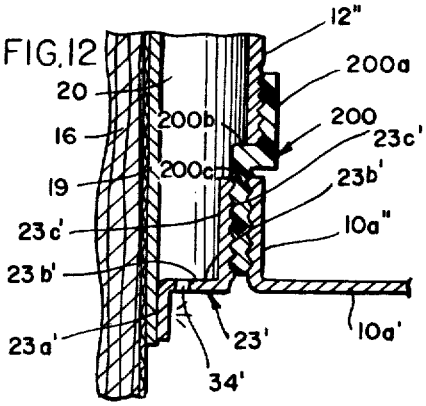
FIGURE 12 is another view similar to FIG. 6, showing still another modification of the heater of FIG. 1.

Modified heat insulating means are illustrated in FIGS. 11 and 12, which are similar to FIG. 6. Corresponding parts have been given the same numbers. If the part has been modified, the number is given a prime or a double prime, and new elements have been given new numbers. The principal difference between the embodiment of FIG. 11 and that of FIG. 12 is that the support tube 12' of FIG. 11 has its lower end terminate at a spaced distance above the top of base 10, and an insulating collar 100 is employed for uniting tube 12' to attachment collar 22. Collar 100 provides an outwardly offset upper portion 100a which is internally threaded for connection to the threaded lower end of tube 12', and an inwardly offset intermediate portion 100b which is externally threaded for connection to the threaded collar portion 22b. Collar 100 also provides a shoulder 100c which can function as a stop for the lower end of support tube 12', and an annular foot portion 10b for bearing against collar against collar portion 23b to clamp gasket 54 to the inner end of shell portion 10d.

In FIGURE 12, the heat insulating collar 200 has an upper portion 200a which is internally threaded for connection to the lower threaded end of support tube 12''. The offset portion 200b can act as a stop for the lower end of tube 12''. The lower end portion 200c of the collar is threaded on both sides for connection to the threaded, upwardly-extending portion 10a'' of shell 10a', and the upwardly-extending portion 23c' of attachment collar 23'. The heat insulating collars 100 and 200 can be molded from a suitable heat-resistant plastic, such as a phenol-formaldehyde resin (e.g., Bakelite). More generally, collars 100 and 200 can be formed of any non-metallic heat insulating materials, such as plastics or ceramics.

While in the foregoing specification, this invention has been described in relation to specific preferred embodiments thereof, and many details have been set forth for purpose of illustration, it will be apparent to those skilled in the art that the invention is susceptible to additional embodimens and that certain of the details described herein can be varied considerably without departing from the scope of the invention.

We claim:

1. A catalytic heater capable of sustaining a substantially uniform high rate of fuel consumption from full fuel charge to empty:

said heater being of the kind having a base housing, a combustion head thereabove providing an enclosed fuel vapor collection space, the top portion of said head being formed by a porous catalytic combustion element in vapor transfer relation with said collection space, and a tubular connector extending between said combustion head and said base housing;

said heater being characterized by (a) an unpacked reservoir for liquid fuel provided with said base housing, (b) fuel transfer means including a capillary action wick for transferring the fuel from said reservoir in the liquid state through said connector to said collection space for evaporation therein, (c) said connector including an outer support tube and an inner wick tube with an annular space therebetween the inner of said tubes receiving an intermediate portion of said wick, and (d) means for positioning and holding said intermediate wick portion within said wick tube to prevent shifting of said wick with respect thereto.

2. The catalytic heater of claim 1 wherein said heater also includes an annular plug of fibrous insulating absorbent material substantially filling the upper portion of said annular space between said support tube and said wick tube.

3. The catalytic heater of claim 1 wherein said combustion head also includes an outer metal screen extending over said catalytic combustion element, and said combustion head is further characterized by having a highly heat conductive bottom wall connected at its periphery to said metal screen in heat conductive relation therewith and extending inwardly beneath said catalytic combustion element and said vapor collection space in heat radiation relation therewith to the vicinity of the upper end of said wick, whereby in starting said heater said catalytic combustion element is heated more rapidly to the temperature required to maintain catalytic combustion and fuel vaporization from said wick is promoted.

4. A catalytic heater capable of sustaining a substantially uniform high rate of fuel consumption from full fuel charge to empty:

said heater being of the kind having a base housing, a combustion head thereabove providing an enclosed fuel vapor collection space, the top portion of said head being formed by a porous catalytic combustion element in vapor transfer relation with said collection space, and a tubular connector extending between said combustion head and said base housing;

said heater being characterized by (a) an unpacked reservoir for liquid fuel provided within said base housing, (b) fuel transfer means for transferring the fuel from said reservoir substantially entirely in the liquid state through said connector to said collection space for evaporation therein, said fuel transfer means including a capillary action wick having a lower portion extending to the bottom portion of said reservoir and being in open, unhindered flow communication with said reservoir and the fuel therein, and (c) a protective canopy enclosing said head and mounted thereon and terminating above and out of contact with said base housing, and (d) a ventilated protective collar surrounding said connector and spaced outwardly therefrom.

5. A catalytic heater capable of sustaining a substantially uniform high rate of fuel consumption from full fuel charge to empty:

said heater being of the kind having a base housing a combustion head thereabove providing an enclosed fuel vapor collection space, the top portion of said head being formed by a porous catalytic combustion element in vapor transfer relation with said collection space, and a tubular connector extending between said combustion head and said base housing;

said heater being characterized by (a) an unpacked reservoir for liquid fuel provided within said base housing, (b) fuel transfer means for transferring the fuel from said reservoir in the liquid state through said connector to said collection space for evaporation therein, said fuel transfer means including a wick having an exposed upper portion extending into said collection space to a spaced distance above the bottom wall of said combustion head, (c) said combustion head having a heat conductive bottom wall formed of aluminum, and a metal screen extending over the outside of said head, said bottom wall and said metal screen being connected at their peripheries in heat conductive relation, and (d) radiation baffle means mounted between the bottom wall of said combustion head and the top of said base housing to reduce the transfer of radiant heat to the said reservoir and the liquid fuel therein.

6. A catalytic heater capable of sustaining a substantially uniform high rate of fuel consumption from full fuel charge to empty:

said heater being of the kind having a base housing, a combustion head thereabove providing an enclosed fuel vapor collection space, the top portion of said head being formed by a porous catalytic combustion element in vapor transfer relation with said collection space, and a tubular connector extending between said combustion head and said base housing;

said heater being characterized by (a) an unpacked reservoir for liquid fuel provided within said base housing, (b) fuel transfer means for transferring the fuel from said reservoir in the liquid state through said connector to said collection space for evaporation therein, said fuel transfer means including a wick having an exposed upper portion extending into said collection space to a spaced distance above the bottom wall of said combustion head, (c) said combustion head having a heat conductive bottom wall formed of aluminum, and a metal screen extending over the outside of said head, said bottom wall and said metal screen being connected at their peripheries in heat conductive relation, and (d) means supporting and connecting the inner portion of said combustion head bottom wall to the upper portion of said connector including a heat insulating gasket interposed in said connection to reduce the conduction of heat from said bottom wall to said connector.

7. A catalytic heater capable of sustaining a substantially uniform high rate of fuel consumption from full fuel charge to empty:

said heater being of the kind having a base housing, a combustion head thereabove providing an eclosed fuel vapor collection space, the top portion of said head being formed by a porous catalytic combustion element in vapor transfer relation with said collection space, and a tubular connector extending between said combustion head and said base housing;

said heater being characterized by (a) an unpacked reservoir for liquid fuel provided within said base housing, (b) fuel transfer means for transferring the fuel from said reservoir in the liquid state through said connector to said collection space for evaporation therein, (c) radiation baffle means mounted between the bottom of said combustion head and the top of said base housing to reduce the transfer of radiant heat to the said reservoir and the liquid fuel therein, (d) said combustion head providing a heat conductive metal wall extending inwardly from the outer periphery of said head above said radiation baffle means and beneath said fuel vapor collection space in heat transfer relation therewith to the vicinity of the upper portion of said fuel transfer means, and (e) said combustion head also providing a metal screen extending over said combustion element and having its peripheral portion connected to said metal wall periphery in heat conductive relation therewith.

8. A catalytic heater capable of sustaining a substantially uniform high rate of fuel consumption from full fuel charge to empty:

said heater being of the kind having a base housing, a combustion head thereabove providing an enclosed fuel vapor collection space, the top portion of said head being formed by a porous catalytic combustion element in vapor transfer relation with said collection space, and a tubular connector extending between said combustion head and said base housing;

said heater being characterized by (a) an unpacked reservoir for liquid fuel provided within said base housing, (b) fuel transfer means for transferring the fuel from said reservoir in the liquid state through said connector to said collection space for evaporation therein, said fuel transfer means including a capillary action wick having a lower portion extending to the bottom portion of said reservoir and being in open, unhindered flow communication with said reservoir and the fuel therein, the intermediate portion of said wick extending through said connector and being housed therein by enclosure means substantially preventing the passage of fuel in the vapor state from said reservoir to said collection space, and the upper portion of said wick extending into said collection space to a predetermined height therein, (c) heat insulating means interposed in the paths of conductive heat flow from said combustion head through said connector to said base housing for minimizing the heating of said reservoir and the liquid fuel therein by conduction of heat from said head, (d) radiation baffle means mounted adjacent the bottom of said combustion head and spaced above the top of said base housing to reduce the transfer of radiant heat to the said reservoir and the liquid fuel therein, and (e) said combustion head having heat conductive wall means extending inwardly above said radiation baffle means and below said fuel vapor collection space in heat transfer relation therewith, the outer peripheral portion of said wall means receiving heat from said combustion element.

9. A catalytic heater capable of sustaining a substantially uniform high rate of fuel consumption from full fuel charge to empty:

said heater being of the kind having a base housing, a combustion head thereabove providing an enclosed fuel vapor collection space, the top portion of said head being formed by a porous catalytic combustion element in vapor transfer relation with said collection space, and a tubular connector extending between said combustion head and said base housing;

said heater being characterized by (a) an unpacked reservoir for liquid fuel provided within said base housing, (b) fuel transfer means including a capillary action wick for transferring the fuel from said reservoir in the liquid state through said connector to said collection space for evaporation therein, (c) said connector including an outer tube and an inner wick tube with an annular space therebetween, the inner of said tubes receiving an intermediate portion of said wick, (d) means for positioning said intermediate wick portion within said wick tube, and (e) an annular plug of porous absorbent material substantially filling the upper portion of said annular space between said inner and outer tubes.

10. The catalytic heater of claim 9 wherein pressure relief means is provided for maintaining said reservoir at substantially the pressure of said vapor collection space, said pressure relief means including vent port means connecting the lower portion of said annular space with the upper portion of said reservoir, said annular plug being interposed in the path of pressure equalization between said reservoir and said vapor collection space.

11. A catalytic heater capable of sustaining a substantially uniform high rate of fuel consumption from full fuel charge to empty:

said heater being of the kind having a base housing, a combustion head thereabove providing an enclosed fuel vapor collection space, the top portion of said head being formed by a porous catalytic combustion element in vapor transfer relation with said collection space, and a tubular connector extending between said combustion head and said base housing;

said heater being characterized by (a) an unpacked reservoir for liquid fuel provided within said base housing, (b) fuel transfer means for transferring the fuel from said reservoir substantially entirely in the liquid state through said connector to said collection space for evaporation therein, said fuel transfer means including a capillary action wick having a lower portion extending to the bottom portion of said reservoir and being in open, unhindered flow communication with said reservoir and the fuel therein, (c) means for housing an intermediate portion of said wick within said connector, said means including a tubular member snugly receiving said intermediate wick portion around the full circumference thereof, (d) pressure relief means for maintaining said reservoir at substantially the pressure of said vapor collection space, said pressure relief means including an enclosed passage extending along the outside of said tubular member and connecting the upper portion of said reservoir with said vapor collection space, and (e) a plug of porous absorbent material interposed in said enclosed passage and substantially filling a cross section thereof.

12. A catalytic heater capable of sustaining a substantially uniform high rate of fuel consumption from full fuel charge to empty:

said heater being of the kind having a base housing, a combustion head thereabove providing an enclosed fuel vapor collection space, the top portion of said head being formed by a porous catalytic combustion element in vapor transfer relation with said collection space, and a tubular connector extending between said combustion head and said base housing;

said heater being characterized by (a) an unpacked reservoir for liquid fuel provided within said base housing, (b) fuel transfer means for transferring the fuel from said reservoir substantially entirely in the liquid state through said connector to said collection space for evaporation therein, said fuel transfer means including a capillary action wick having a lower portion extending to the bottom portion of said reservoir and being in open, unhindered flow communication with said reservoir and the fuel therein, (c) a protective canopy enclosing said head and mounted thereon and terminating above and out of contact with said base housing, (d) radiation baffle means mounted between the bottom of said combustion head and the top of said base housing to reduce the transfer of radiant heat to the said reservoir, and (e) heat insulating means interposed in the paths of conductive heat flow from said combustion head through said connector to said base housing for minimizing the heating of said reservoir by the conduction of heat from said head.

13. The catalytic heater of claim 12 wherein there is also provided heat conductive wall means extending inwardly above said radiation baffle means and below said fuel vapor collection space in heat transfer relation therewith, the outer peripheral portion of said wall means receiving heat from said combustion element.

14. The catalytic heater of claim 12 wherein there is also provided a protective collar surrounding said connector and spaced outwardly therefrom, said collar extending between the bottom of said radiation baffle means and the top of said base housing and supporting said radiation baffle means.

*15. A catalytic heater capable of sustaining a substantially uniform high rate of fuel consumption from full fuel charge to empty:*

*said heater being of the kind having a base housing, a combustion head thereabove providing an enclosed fuel vapor collection space, the top portion of said head being formed by a porous catalytic combustion element in vapor transfer relation with said collection space, and a tubular connector extending between said combustion head and said base housing; said heater being characterized by*

*(a) an unpacked reservoir for liquid fuel provided within said base housing,*

*(b) fuel transfer means including a capillary action wick for transferring the fuel from said reservoir in the liquid state through said connector to said collection space for evaporation therein,*

*(c) said connector including an outer support tube and an inner wick tube with an annular space therebetween, the inner of said tubes receiving an intermediate portion of said wick,*

*(d) means for positioning and holding said intermediate wick portion within said wick tube to prevent shifting of said wick with respect thereto, and*

*(e) radiation baffle means mounted between said catalytic combustion element and the top of said base housing to reduce the transfer of radiant heat to said reservoir and the liquid fuel therein.*

*16. The catalytic heater of claim 15 in which said combustion head includes a bottom pan facing said base housing, said radiation baffle means being supported by said bottom pan.*

*17. The catalytic heater of claim 15 including heat insulating means interposed in the paths of conductive heat flow from said combustion head through said connector to said base housing for minimizing the heating of said reservoir by the conduction of heat from said head.*

*18. The catalytic heater of claim 15 including pressure relief means for maintaining said reservoir at substantially the pressure of said vapor collection space.*

*19. The catalytic heater of claim 15 in which said combustion head includes a bottom pan between said com-*

*bustion element and said base housing, said radiation baffle means comprising an insulating fibrous mat extending across substantially the full width of said combustion head and being supported by said pan, said mat having a heat reflective metal foil upper layer.*

*20. The catalytic heater of claim 15 including heat insulating means interposed in the paths of conductive heat flow from said combustion head through said conductor to said base housing for minimizing the heating of said reservoir by the conduction of heat from said head, and pressure relief means for maintaining said reservoir at substantially the pressure of said vapor collection space.*

References Cited

The following references, cited by the Examiner, are of record in the patented file of this patent or the original patent.

UNITED STATES PATENTS

| | | | |
|---|---|---|---|
| 1,347,631 | 7/1920 | Herck | 431—241 X |
| 1,608,388 | 11/1926 | Gritte | 431—241 |
| 3,240,256 | 3/1966 | Binkley et al. | 431—241 |
| 2,019,646 | 11/1935 | Barhoff | 158—94 X |
| 2,658,742 | 11/1953 | Suter et al. | |

EDWARD G. FAVORS, Primary Examiner

PO-1050
(5/69)

UNITED STATES PATENT OFFICE
CERTIFICATE OF CORRECTION

Patent No. RE 26,976 Dated October 27, 1970

Inventor(s) Donald V. Berchtold, Ellwood E. Little and William J. Marsh

It is certified that error appears in the above-identified patent and that said Letters Patent are hereby corrected as shown below:

In claim 7, line 53, "eclosed" should be --enclosed--.

In claim 20, line 8, "conductor" should be --connector--

SIGNED AND
SEALED
FEB 2 1971

Feb 2 1971

(SEAL)
Attest:

Edward M. Fletcher, Jr.
Attesting Officer

WILLIAM E. SCHUYLER, JR.
Commissioner of Patents